United States Patent
Odate

(10) Patent No.: US 8,412,417 B2
(45) Date of Patent: Apr. 2, 2013

(54) SEATBELT DEVICE OF VEHICLE AND METHOD CONTROLLING THE SEATBELT DEVICE OF VEHICLE

(75) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 503 days.

(21) Appl. No.: 12/554,183

(22) Filed: Sep. 4, 2009

(65) Prior Publication Data
US 2010/0057303 A1   Mar. 4, 2010

(30) Foreign Application Priority Data
Sep. 4, 2008   (JP) .................................. 2008-226991

(51) Int. Cl.
*B60R 22/00* (2006.01)
*B60R 22/36* (2006.01)
*B60R 22/46* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. ......................................... 701/45; 280/806
(58) Field of Classification Search .................... 701/45; 280/806–808
See application file for complete search history.

(56) References Cited

U.S. PATENT DOCUMENTS
2005/0083000 A1* 4/2005 Specht et al. ................. 318/432
2008/0093833 A1  4/2008 Odate
2010/0095787 A1* 4/2010 Murphy et al. .......... 73/862.391

FOREIGN PATENT DOCUMENTS
| EP | 2 077 209 | 7/2009 |
| JP | 2004-291967 | 10/2004 |
| JP | 2007-118825 | 5/2007 |
| JP | 2008-120194 | 5/2008 |

* cited by examiner

Primary Examiner — Thomas Tarcza
Assistant Examiner — Imran Mustafa
(74) Attorney, Agent, or Firm — Rankin, Hill & Clark LLP

(57) ABSTRACT

A seatbelt device of a vehicle, the seatbelt device comprising: a belt reel around which a webbing, used to tie down a passenger seated in the vehicle, is wrapped up; a motor transmitting a driving force to the belt reel; an electric current detection unit detecting an electric current flowing through the motor; a vehicle-condition detection unit detecting a condition of the vehicle; a rotation detection unit detecting a rotational position of the belt reel; and a control unit that sets a target electric current corresponding to a predetermined vehicle condition detected by the vehicle-condition detection unit and controls the motor so that the electric current detected by the electric current detection unit equals the target electric current.

3 Claims, 10 Drawing Sheets

SEATBELT DEVICE OF VEHICLE AND METHOD CONTROLLING THE SEATBELT DEVICE OF VEHICLE

BACKGROUND OF THE INVENTION

The present application claims priority on Japanese Patent Application No. 2008-226991, filed Sep. 4, 2008, the content of which is incorporated herein by reference.

FIELD OF THE INVENTION

The present invention relates to a seatbelt device and a method controlling the seatbelt device. The seatbelt device ties down a passenger sitting on a seat of a vehicle by using a webbing.

DESCRIPTION OF THE RELATED ART

According to seatbelt devices equipped in vehicles, the webbing used to tie down a passenger is wrapped up around a belt reel located inside a retractor. When the passenger wears the seatbelt, the webbing is pulled out from the retractor. The seatbelt device also has an emergency locking mechanism. When the velocity of the vehicle decreases at a rate greater than a predetermined value, the emergency locking mechanism prevents the webbing from being pulled out from the retractor. The emergency locking mechanism thus secures the passenger to the seat.

In recent years, some seatbelt devices have been developed, which evaluates the condition of the vehicle using an acceleration sensor, a yaw rate sensor, and a brake switch (refer to, for example, Japanese Unexamined Patent Application, First Publication No. 2004-291967). These seatbelt devices control the tension of the webbing according to the condition of the vehicle.

The seatbelt device described above has a motor that pulls in the webbing, a vehicle-condition detection unit that evaluates the condition of the vehicle, and a controller which receives a detection signal from the vehicle-condition detection unit and controls the amount of electricity flowing to a motor. When the vehicle-condition detection unit detects that the vehicle has turned, the brake has been operated, or a roll over has occurred, the controller determines the amount of electricity supplied to the motor so that the tension of the webbing most appropriate for the condition of the vehicle will be obtained.

However, the seatbelt device described above controls the amount of electricity sent to the motor based on the condition of the vehicle. Thus, when the vehicle-condition detection unit determines that the vehicle has whirled around, electricity continues to be supplied while the vehicle is turning, so that a certain targeted amount of the electric current will be attained. Thus, when the level of electric current is set so that the webbing is wrapped up in an initial stage to prevent the webbing from being loose, the tension of the webbing becomes large when the passenger is tied down in a later stage. As a result, the passenger will be tied down with too much force. On the other hand, when the level of electric current is set so that the webbing will not strap the passenger too tightly in the later stage, the webbing will not be wrapped up fast enough in the initial stage.

According to a seatbelt device that is currently under review, when a detection signal from the vehicle-condition detection unit is received, the webbing is quickly wrapped up initially by supplying a targeted amount of the electric current to the motor based on the condition of the vehicle. Then, the electric current of the motor is set to a lower value, and the seatbelt device waits. When the webbing is pulled out, a certain amount of the electric current is sent to the motor based on the condition of the vehicle. However, when electric current is supplied to the motor according to whether the webbing has been pulled out, it is difficult to respond quickly when the webbing is pulled out suddenly.

Considering the problems described above, the present invention aims to provide a seatbelt device of a vehicle and a method controlling the seatbelt device so that a passenger will be quickly secured to the seat of the vehicle but will not be tied down with too much force.

SUMMARY OF THE INVENTION

In order to achieve the above object, the present invention employs the following.

Namely, a seatbelt device of vehicle according to an aspect of the present invention includes: a belt reel around which a webbing, used to tie down a passenger seated in the vehicle, is wrapped up; a motor transmitting a driving force to the belt reel; an electric current detection unit detecting an electric current flowing through the motor; a vehicle-condition detection unit detecting a condition of the vehicle; a rotation detection unit detecting a rotational position of the belt reel; and a control unit that sets a target electric current corresponding to a predetermined vehicle condition detected by the vehicle-condition detection unit and controls the motor so that the electric current detected by the electric current detection unit equals the target electric current, wherein when the motor is being controlled and the belt reel moves, by a displacement amount exceeding a regulation value, in a direction in which the belt reel is pulled out, a target adjusting unit included in the control unit modifies the target electric current based on the displacement amount.

Based on the seatbelt device of vehicle according to the aspect of the present invention described above, when the vehicle-condition detection unit detects a condition of the vehicle that requires the seatbelt to secure a passenger, a target amount of the electric current is set. The amount of the electric current flowing through the motor is adjusted so that the amount of the electric current detected by the electric current detection unit equals the target amount. When the passenger moves his or her upper body while the above adjustment is carried out, the belt reel might move in the direction in which the belt is pulled out in excess of a predetermined distance. At this time, the target adjusting unit adjusts the target amount of the electric current based on how the belt reel has moved, i.e., based on the change in the position of the belt reel. Electric flow is then supplied to the motor based on the adjusted target amount of the electric current. As a result, the passenger will not be tied down with excessive force as long as the belt reel does not receive any external force due to the movement of the passenger and the like. Moreover, when external force is applied to the belt reel, the passenger is promptly secured because the target amount of the electric current is adjusted according to the change in the position of the belt reel. In these ways, the passenger is secured to the seat instantly and appropriately when he or she moves.

In addition, the seatbelt device of vehicle according to the aspect of the present invention may be configured as follows: the target adjusting unit modifies the target electric current in a cycle same as a monitoring cycle of the rotation detection unit and/or a monitoring cycle of the electric current detection unit.

Based on the seatbelt device of vehicle according to the aspect of the present invention described above, the target adjusting unit performs the adjustment every inspection cycle of the rotation detection unit and/or every inspection cycle of the electric current detection unit. Thus, the control value is appropriately modified according to the actual rotational position of the belt reel and/or the change in the amount of the electric current. Accordingly, the target amount of the electric current is adjusted in a short cycle according to the change in the position of the belt reel. Further, the degree with which the motor pulls in the belt reel is adjusted instantly according to the how the passenger has moved.

In addition, the seatbelt device of vehicle according to the aspect of the present invention may be configured as follows: the control unit further includes a standard electric current controlling unit controlling the electric current flowing through the motor, so that the electric current detected by the electric current detection unit equals the target electric current corresponding to a signal detected by the vehicle-condition detection unit; and an electric current retention controlling unit supplying a small electric current to the motor wherein: when a fluctuation of the target electric current is small, the electric current retention controlling unit supplies the small electric current to the motor, so that the motor acts as a burden to the belt reel in the direction in which the belt reel is pulled out; and when the motor is being controlled by the electric current retention controlling unit and the belt reel moves, by the displacement amount exceeding the regulation value, in the direction in which the belt reel is pulled out, the electric current retention controlling unit stops operating, and the standard electric current controlling unit starts operating again.

Based on the seatbelt device of vehicle according to the aspect of the present invention described above, the electric current retention controlling unit controls the motor when the target amount of the electric current does not fluctuate drastically and is relatively stable. As a result, the passenger will not be tied down with too much force. In addition, the amount of the electric current consumed by the motor will be reduced. When the belt reel moves in a direction in which the belt reel is pulled out in excess of a predetermined distance while the electric current retention controlling unit is controlling the motor, the electric current retention controlling unit stops controlling the amount of electric current supplied to the motor. Instead, the standard electric current controlling unit regains control of the amount of electric current supplied to the motor. Thus, the target amount of the electric current adjusted by the target adjusting unit is reset to a value corresponding to the condition of the vehicle. Consequently, the belt reel can be promptly pulled in. In these ways, the passenger will feel less oppressed by the seatbelt device, the amount of electric current consumed will be reduced by a greater degree, and the passenger will be secured more promptly.

On the other hand, a method controlling the seatbelt device of vehicle described above according to an aspect of the present invention includes a step determining a target electric current supplied to the motor based on a detection signal of the vehicle-condition detection unit; a step setting an output signal of the rotation detection unit as a renewed value of a belt reel position while the target electric current is supplied to the motor; a step recording the belt reel position as a recorded value, comparing the recorded value and the renewed value, and renewing the recorded value; a step computing a difference between the recorded value and the renewed value; a step modifying the target electric current as a modified target electric current based on the difference between the recorded value and the renewed value, when the difference is greater than a preset value; and a step supplying an electric low to the motor based on the modified target electric current wherein when the vehicle-condition detection unit detects a predetermined vehicle condition, the motor is controlled so that the electric current detected by the electric current detection unit equals the target electric current corresponding to the predetermined vehicle condition.

Based on the method controlling the seatbelt device of vehicle according to the aspect of the present invention described above, when the vehicle-condition detection unit detects a condition of the vehicle that requires the seatbelt device to secure a passenger to the seat of the vehicle, the electric current flowing through the motor is controlled so that the amount of the electric current detected by the electric current detection unit equals the target amount of the electric current. While this control is carried out, if the belt reel moves in the direction in which the belt reel is pulled out in excess of a predetermined distance, the target adjusting unit adjusts the target amount of the electric current based on the change in the position of the belt reel. As a result, the passenger will not be tied down with excessive force as long as the belt reel does not receive any external force due to the movement of the passenger and the like. Moreover, when external force is applied to the belt reel, the passenger is promptly secured because the target amount of the electric current is adjusted according to the change in the position of the belt reel.

The above object as well as other objects of the present invention and the present invention's characteristics and advantages will become clearer from the appended figures and the detailed description below.

DETAILED DESCRIPTION OF THE PREFERRED EMBODIMENTS

Hereunder, an embodiment of a seatbelt device of vehicle and a method controlling the seatbelt device of vehicle according to the present invention is described with reference to the drawings.

Figure 1:
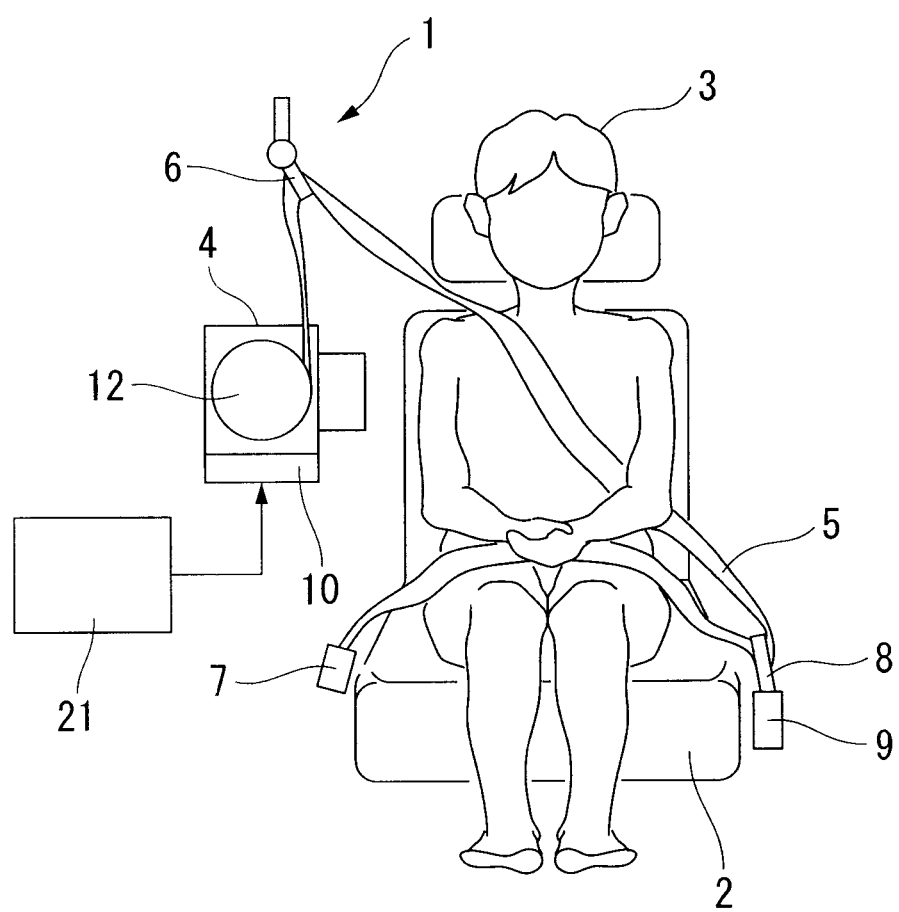
FIG. 1 is a skeletal framework of a seatbelt device of vehicle according to an embodiment of the present invention.

FIG. 1 is a skeletal framework showing an overall configuration of a seatbelt device 1 according to the above embodiment of the present invention. FIG. 1 shows a seat 2 on which a passenger 3 is seated. The seatbelt device 1 according to the above embodiment of the present invention is a seatbelt device generally known as a three-point type seatbelt. A webbing 5 is pulled upwards from a retractor 4 installed on a center pillar (not diagrammed). The webbing 5 is passed through a through anchor 6 supported by an upper portion of the center pillar. A tip of the webbing 5 is fixed to a floor of a vehicle body via an outer anchor 7 located on the seat 2 positioned towards the outer side of the vehicle's interior. A tongue plate 8 is passed between the through anchor 6 of the webbing 5 and the outer anchor 7. The tongue plate 8 can be attached to or be detached from a buckle 9 fixed to the floor of the vehicle body of the seat 2 towards the inner side of the vehicle's interior.

The webbing 5 is initially wrapped up by the retractor 4. When the passenger 3 pulls out the webbing 5 with his or her hand and attaches the tongue plate 8 to the buckle 9, the webbing 5 ties down primarily the passenger 3's chest and abdomen against the seat 2. An electrically-operated motor 10 automatically pulls in the webbing 5 when the movement of the vehicle changes drastically and when an emergency occurs.

Figure 2:
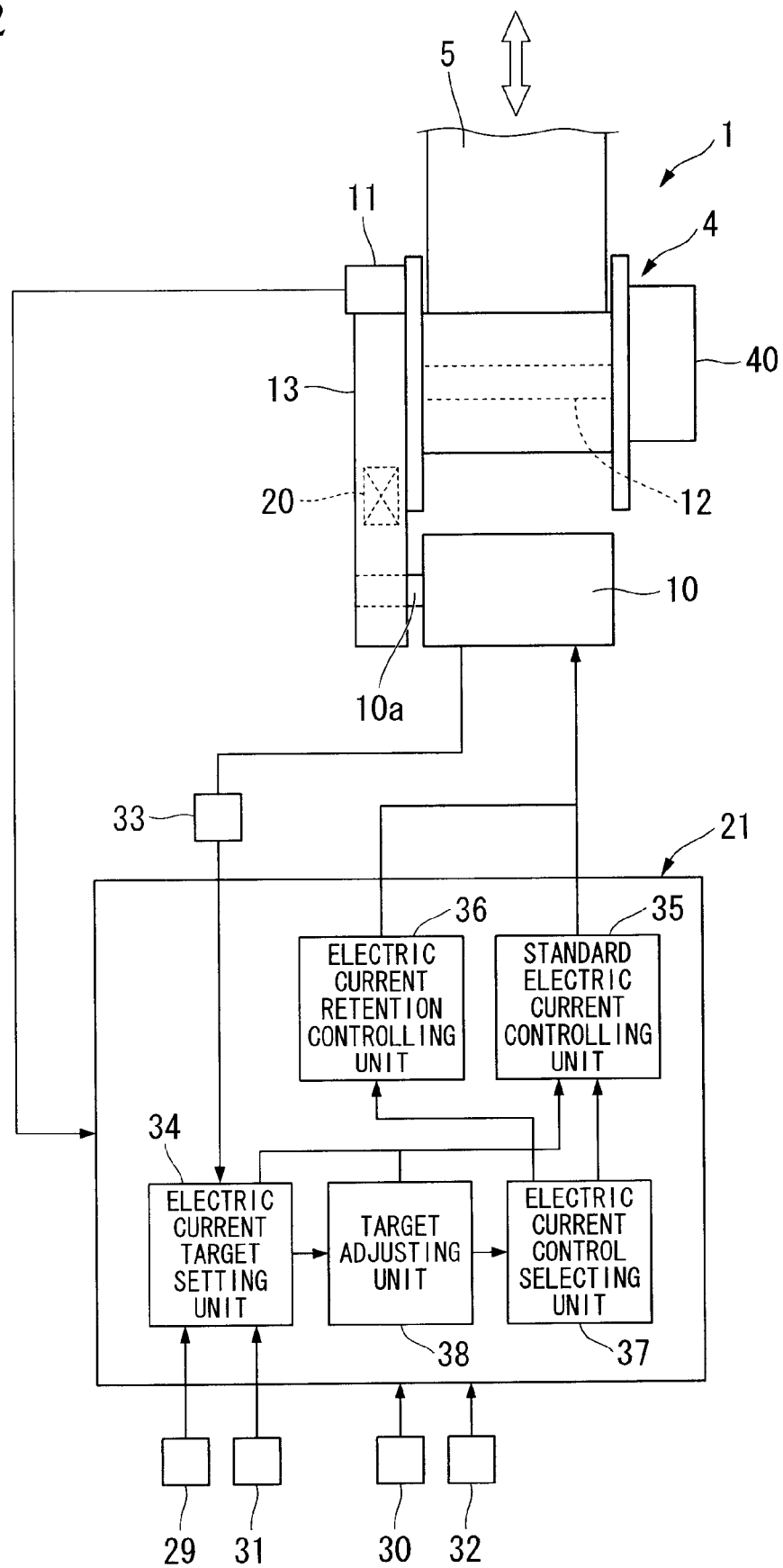
FIG. 2 is a skeletal framework of a retractor and a controller of the seatbelt device of vehicle according to the above embodiment of the present invention.

The retractor 4 is structured so that, as shown in FIG. 2, the webbing 5 is wrapped around the belt reel 12 which is supported by a casing (not diagramed) so that the belt reel 12 can rotate. Further, an axis of the belt reel 12 protrudes from one side of an edge of the casing. The belt reel 12 is connected to a rotational axis 10a of the motor 10 via a power transmission mechanism 13 so that the belt reel 12 can interlock with the rotational axis 10a. The power transmission mechanism 13 decelerates the rotation of the motor 10 and transmits power to the belt reel 12. A take-up spring (not diagramed) is placed on the retractor 4. The take-up spring biases the belt reel 12 in the direction in which the webbing is rolled up. The tension produced by the take-up spring operates on the webbing 5 while the belt reel 12 and the motor 10 are separated by a clutch 20 (refer to FIGS. 3-4) described below.

A rotational sensor 11 (rotation-condition detection unit) is placed on the retractor 4. The rotational sensor 11 detects the rotation of the belt reel 12. The rotational sensor 11 includes, for example, a magnetic circular plate, a pair of hall elements, and a sensor circuit. The magnetic circular plate is structured so that opposite magnetic poles are magnetized in a direction along the circumference. The magnetic circular plate rotates along with the belt reel 12. The pair of hall elements is placed adjacent to the outer rim of the magnetic circular plate. The sensor circuit processes the detection signal of the hall elements. The pulse signal processed by the sensor circuit is outputted to the controller 21.

In this case, the pulse signal is inputted from the sensor circuit to the controller 21 according to the rotation of the belt reel 12. This pulse signal is used to detect, for instance, the number of rotations made by the belt reel 12, the rotational velocity of the belt reel 12, and the direction in which the belt reel 12 is rotating. In other words, the controller 21 detects the number of rotations made by the belt reel 12 (corresponding to how much the webbing 5 is pulled out) by counting the pulse signals. In addition, the controller 21 determines the rotational velocity of the belt reel 12 (corresponding to the velocity at which the webbing 5 is rolled up and pulled out) by computing the change in the velocity (the frequency) of the pulse signal. Furthermore, the controller 21 detects the direction in which the belt reel 12 is rotating by comparing the rearing of the wave forms of two pulse signals.

An emergency locking mechanism 40 is equipped on the retractor 4. When the velocity of the vehicle declines by a degree greater than a predetermined value, the emergency locking mechanism 40 mechanically locks the rotation of the belt reel 12 (corresponding to the pulling out of the webbing 5). The emergency locking mechanism 40 includes a sensing element (not diagramed) and a locking element (not diagrammed). The sensing element operates when an acceleration greater than or equal to a predetermined value (for instance, 2 G) is inputted to the vehicle. Given the operation of the sensing element, the locking element locks the rotation of the belt reel 12. The locking element can unlock the belt reel 12 after the locking operation has been conducted by rotating the belt reel 12 by an amount greater than a predetermined value in the direction in which the webbing is rolled up.

Figure 3:
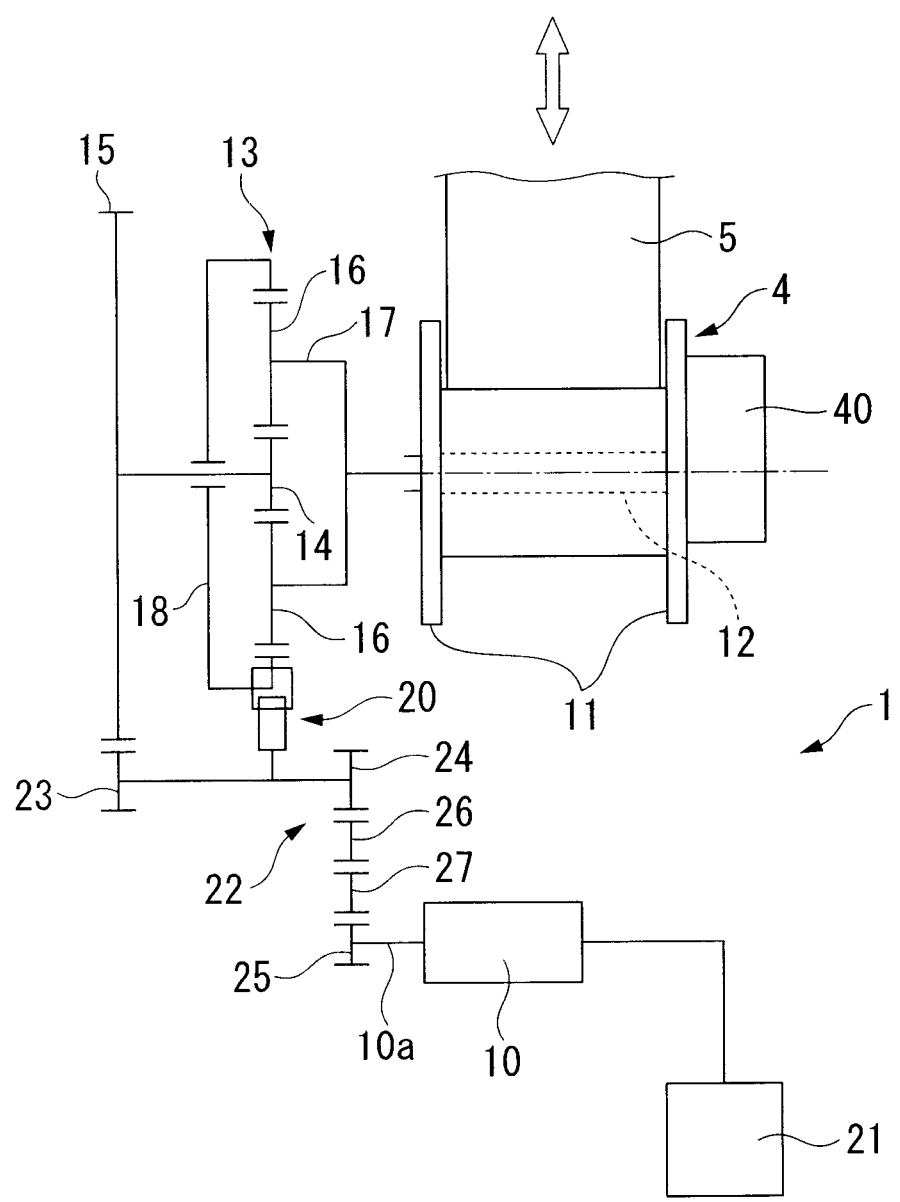
FIG. 3 is a skeletal framework of a retractor portion of the seatbelt device of vehicle according to the above embodiment of the present invention.
Figure 4:
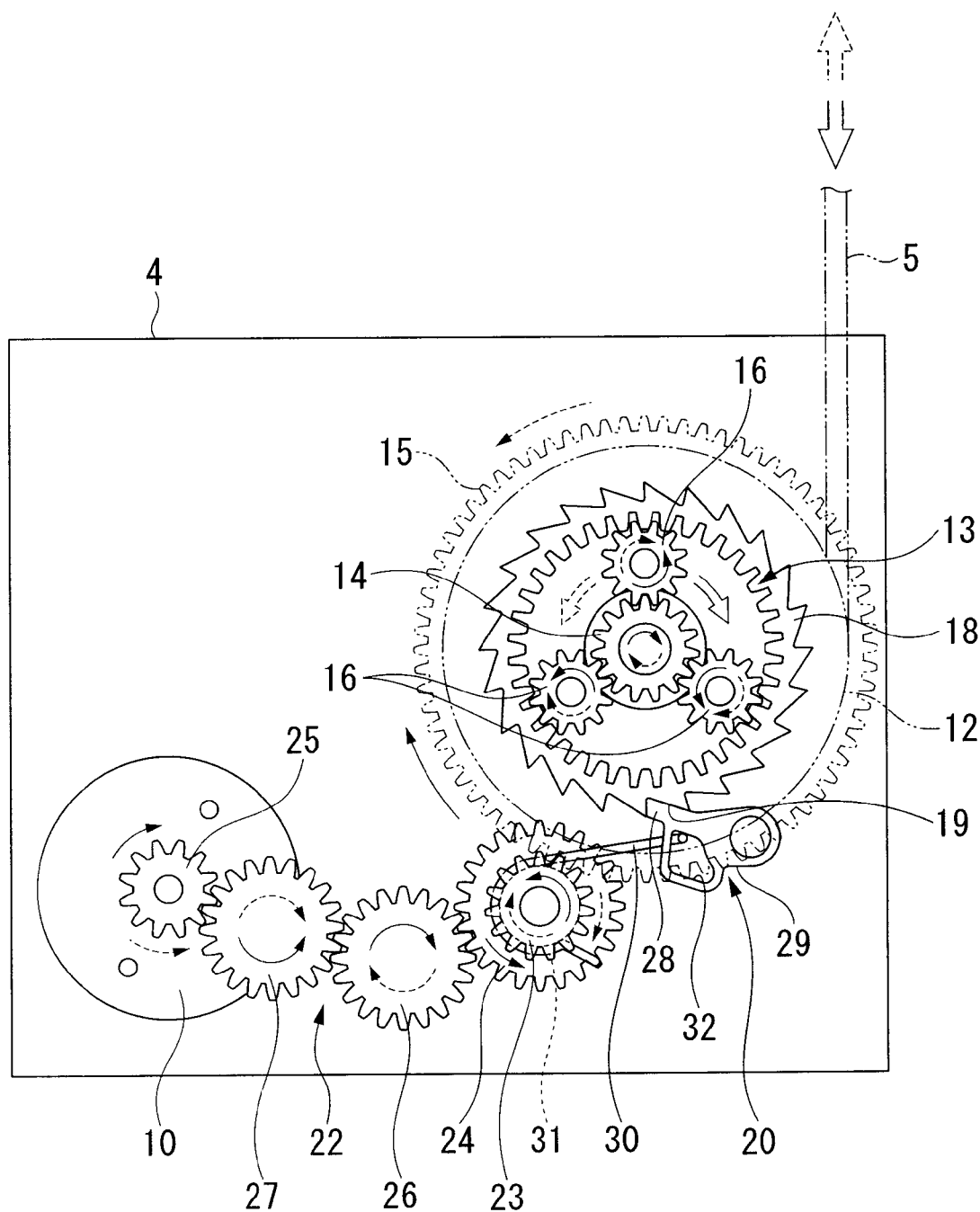
FIG. 4 is a frontal view of a skeletal framework of a power transmission system of the retractor according to the above embodiment of the present invention

As shown in FIGS. 3-4, the power transmission 13 is structured so that a sun gear 14 is integrated with an external gear 15 used to input the drive. At the same time, a carrier 17 supporting multiple planetary gears 16 is connected to the axis of the belt reel 12. Thus, multiple ratchet teeth 19 (refer to FIG. 4) are formed along the outer circumference of a ring gear 18. The ring gear 18 engages with a planetary gear 16. This ratchet tooth 19 is included as one part of the clutch 20. The clutch 20 connects and disconnects the power transmission mechanism between the motor 10 and the belt reel 12 based on a controlling operation by a motor control device 21.

A motor-side power transmission system 22 of the power transmission mechanism 13 includes a first connect gear 23 with a small radius, which constantly engages with the external gear 15 integrated with the sun gear 14; a second connect gear 24 with a large radius, which is set up to rotate with the first connect gear 23 as an integrated whole on a same axis; and a first idle gear 26 and a second idle gear 27, both of which are located between the second connect gear 24 and a motor gear 25 (integrated with the rotational axis 10E of the motor 10) and are constantly engaged with each other so that power can be transmitted. The driving force of the motor 10 in the direction of normal rotation is transmitted to the second connect gear 24 and the first connect gear 23 through gears 25, 27, and 26 respectively, as shown by a solid arrow in FIG. 4. Further, the driving force is transmitted to the sun gear 14 via the external gear 15. Then, the driving force is transmitted to the belt reel 12 via the planetary gear 16 and the carrier 17. The driving force of the motor 10 in the direction of normal rotation causes the rotation of the belt reel 12 in the direction in which the webbing 5 is pulled in. The driving force, transmitted from the sun gear 14 to the planetary gear 16, is transmitted entirely to the side of the carrier 17, as described above, when the ring gear 18 is fixed.

Meanwhile, when the ring gear 18 can rotate freely, the ring gear 18 idles away due to the planetary gear 16 rotating on its own axis. The clutch 20 turns on or off a transmission of the motor's driving force to the belt reel 12 (carrier 17) by controlling the locking and unlocking of the rotation of the ring gear 14.

Next, the clutch 20 is described with reference to FIGS. 4 and 5.

The clutch 20 is supported by a casing (not diagramed) so that the clutch can turn. The clutch 20 includes a pawl 29 that has a locking click 28 on its tip; a clutch spring 30 that operates this pawl 29; and the ratchet tooth 19 of the ring gear 14 that can engage with the locking click 28 of the pawl 29. When the pawl 29 is operated in the direction of the ratchet tooth 19, the locking click 28 hits a plane that is approximately orthogonal to a sloped surface of the ratchet tooth 19. In this way, the locking click 28 locks a rotation of the ring gear 14 in one direction.

Further, a base of the clutch spring 30 is curved forming an arc. The curved part 31 is locked so that the curved part 31 is wrapped to the outer circumference of an axis of the first connect gear 23. Further, a tip of the clutch spring 30 is elongated in the direction of the pawl 29, and engages with an access window 32 of the pawl 29. The curved part 31 of the clutch spring 30 engages with an axis of the first connect gear 23 due to friction. When a torque greater than or equal to a predetermined value operates between the first connect gear 23 and the curved part 31, the torque causes a slipping between the first connect gear 23 and the curved part 31.

Figure 5:
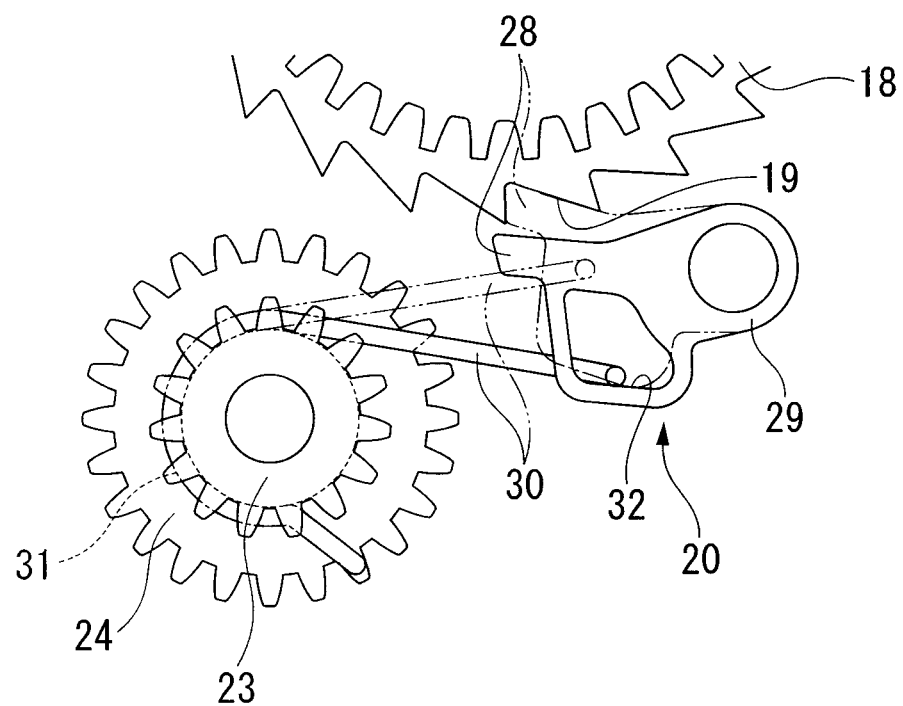
FIG. 5 is an enlarged view of a portion of a power transmission system according to the above embodiment of the present invention.

Therefore, the clutch 20 is structured so that, when the motor 10 rotates in the direction of normal rotation (refer to the solid arrow shown in FIG. 4), the clutch spring 30 changes its position from that shown in a solid line in FIG. 5 to the position shown in a dotted line. As a result, the locking click 28 of the pawl 29 engages with the ratchet tooth 19 as shown in FIG. 4, and locks the rotation of the ring gear 18. Thus, the ratchet tooth 19 can reliably lock the rotation of the ring gear 18 in one direction. However, when the ring gear 18 tries to rotate in the opposite direction, a force greater than or equal to a certain magnitude is necessary for the ratchet tooth 19 to push up the locking click 28. Accordingly, the clutch spring 30 applies a resistance force greater than or equal to a certain magnitude to a rotation of the ring gear 18 in the opposite direction.

When a rotation of the ring gear 18 is locked as described above, the rotational force that was transmitted to the sun gear 14 is transmitted entirely to the belt reel 12, causing the rotation of the carrier 17 (referred to as a state of clutch engaging).

Meanwhile, when the motor 10 rotates in the opposite direction from the state of clutch engaging, the first connect gear 23 rotates as shown in a dotted arrow in FIG. 4. In addition, the clutch spring 30 moves as shown in a solid line in FIG. 5. Thus, the locking click 28 of the pawl 29 is detached from the ratchet tooth 19, and the ring gear 18 is unlocked.

When the ring gear 18 is unlocked as described above, the rotational force transmitted to the sun gear 14 makes the planetary gear 16 rotate on its own axis. At this time, the ring gear 18 idles away so that power will not be transmitted to the side of the carrier 17 (the belt reel 12) (referred to as state of clutch released).

Incidentally, as shown in FIG. 2, the controller 21 is connected with a lateral acceleration sensor 29, a longitudinal acceleration sensor 30, a yaw rate sensor 31, a vehicle-velocity sensor 32 and the like which detects the condition of the vehicle, and sensors such as a buckle switch (not diagramed) which detects whether the buckle 9 is connected. In addition, the controller 21 is connected to an electric current detection unit 33 which detects the electric current flowing through the motor 10.

In addition, the controller 21 includes an electric current target setting unit 34, a standard electric current controlling unit 35, an electric current retention controlling unit 36, an electric current control selecting unit 37, and a target adjusting unit 38. The electric current target setting unit 34 sets the target amount of the electric current flowing through the motor 10 according to the condition of the vehicle on a periodical basis (for example, 5-20 msec/cycle). The electric current controlling unit 35 controls the amount of the electric current flowing through the motor 10 so that the amount of the electric current equals the target amount set by the electric current target setting unit 34. The electric current retention controlling unit 36 sends a small electric current to the motor 10 so that the clutch 20 continues to be engaged. The electric current control selecting unit 37 monitors the temporal change in the target amount of the electric current set by the electric current target setting unit 34. The electric current control selecting unit 37 then selects either the electric current controlling unit 35 or the electric current retention controlling unit 36. When the belt reel 12 moves in the direction in which the webbing is pulled out in excess of a predetermined value Xth while the motor 10 is under operation, the target adjusting unit 38 adjusts the target amount of the electric current based on the change in the position of the belt reel 12. The controller 21 controls the electric current flowing through the motor 10 according to the electric current control mode chosen by the electric current control selecting unit.

The electric current target setting unit 34 determines the standard target amount of the electric current necessary to wrap up the webbing 5 based on the signals detected by the lateral acceleration sensor 29 and the yaw rate sensor 31 by performing computations and referring to maps and the like.

Via the electric current detection unit 33, the standard electric current controlling unit 35 constantly feeds back the amount of the electric current that actually flowed through the motor 10. The standard electric current controlling unit 35 thus controls the electric current so that the amount of electric current flowing through the motor 10 equals the target amount of the electric current.

The electric current retention controlling unit 36 eventually supplies the minimum amount of electric current to the motor 10 that can keep the clutch 20 connected (for example, 0.2 A). During the time in which the place of operation shifts from the standard electric current controlling unit 35 to the electric current retention controlling unit 36, an intermediate amount of electric current (for example, 0.6 A) greater than the minimum amount is supplied to the motor for a predetermined amount of time (for example, 01 sec). According to the present embodiment, the electric current retention controlling unit 36 also controls the electric current through feedback control so that the amount of the electric current running through the motor 10 equals the target amount (the intermediate amount of the electric current or the minimum amount).

For example, the electric current control selecting unit 37 stores the standard target electric current Id as data. The electric current target setting unit 34 periodically sets the standard target electric current Id. The electric current control selecting unit 37 next determines the average electric current Iavg based on the data of the standard target electric current. The electric current control selecting unit 37 compares the standard target electric current Id and the average electric current Iavg. When Id*0.8<Iavg, for instance, the electric current control selecting unit 37 selects the electric current retention controlling unit 36 as the unit that controls the electric current.

Figure 9:
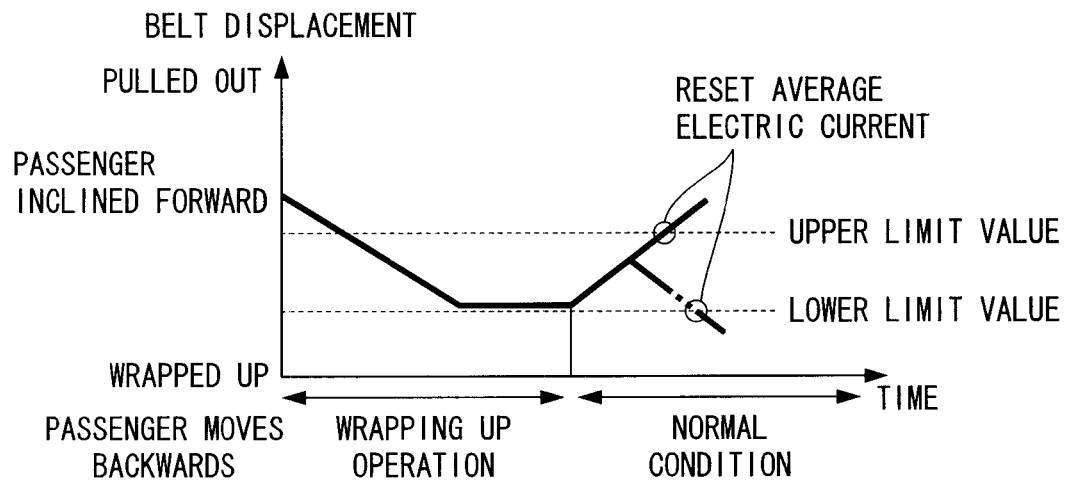
FIG. 9 is a graph showing a timing of a resetting of an average amount of electric current according to the above embodiment of the present invention.

The average electric current Iavg, used by the electric current control selecting unit 37, is calculated not only when the motor 10 is wrapping up the webbing 5, but also in other situations (normal conditions). As shown in FIG. 9, when the motor 10 does not wrap up the webbing 5 (normal conditions), the calculation of the average electric current Iavg is reset when the position at which the webbing 5 is pulled out becomes greater than or equal to a predetermined upper value or becomes less than or equal to a lower value. As a result, the average electric current Iavg does not fluctuate by an unnecessarily large amount during normal conditions.

When the passenger suddenly moves his or her upper body while the motor 10 is being controlled, and the length of the webbing 5 being pulled out as a result is large, the target adjusting unit 38 increases the target amount of the electric current based on the change in the position of the belt reel 12. Thus, the target adjusting unit 38 prevents the webbing 5 from being pulled out too suddenly.

Figure 6:
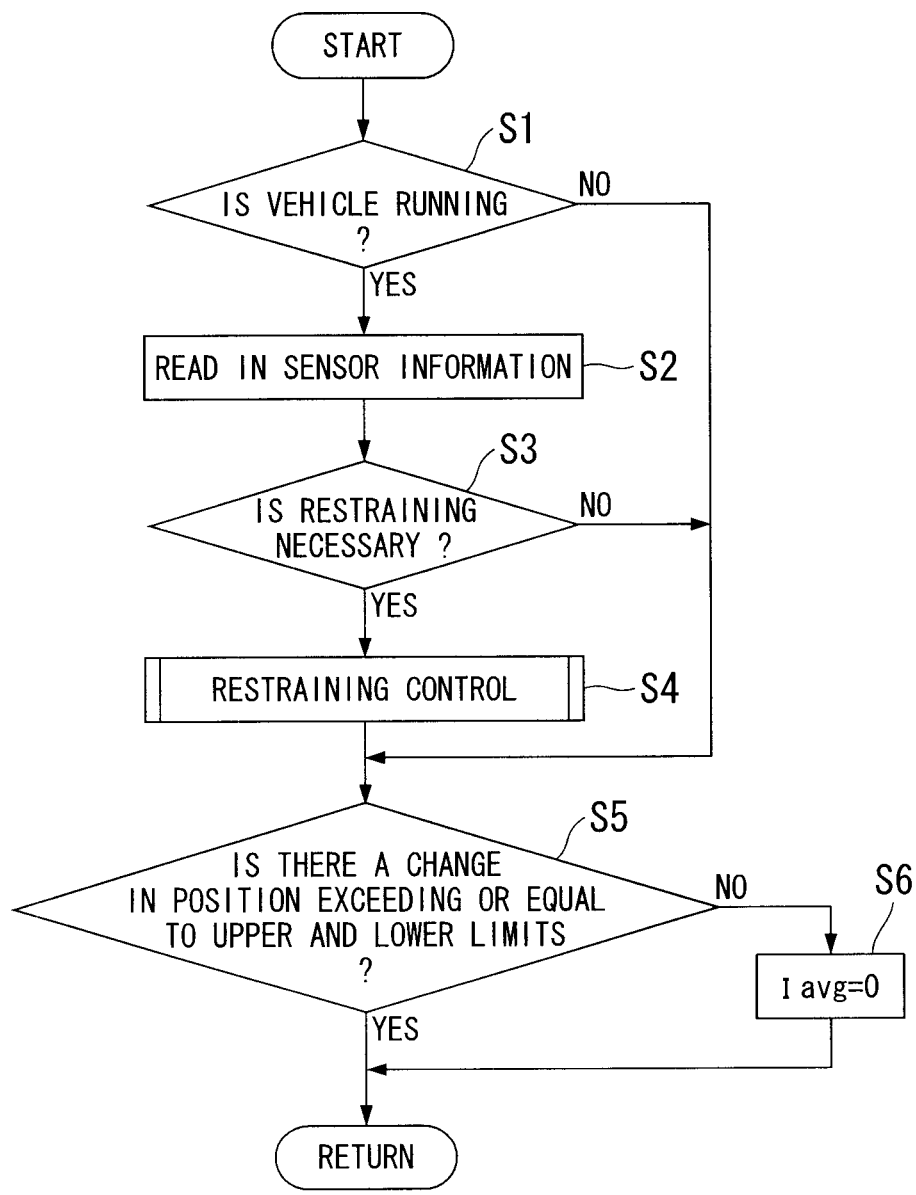
FIG. 6 is a flowchart showing a flow of a control according to the above embodiment of the present invention.

Hereinafter, the control operation of the seatbelt device 1 performed by the controller 21 is described with reference to the flow chart in FIGS. 6-8. FIG. 6 shows the main flow performed by the controller 21.

In step S1 of the main flow, the value detected by the vehicle speed sensor 32 is used to determine whether or not the vehicle is currently running. If the result is YES, the routine proceeds to step S2. If the result is NO, the routine proceeds to step S5.

In step S2, sensor information is inputted from the acceleration sensors 29-30 and from the yaw rate sensor 31 and the like. Next, in step S3, the sensor information is used to determine whether or not the passenger needs to be tied down by the webbing 5. Whether the passenger needs to be tied down is decided in step S3 by, for instance, determining whether the acceleration and the yaw rate deflection exceed a standard value. The determination of whether the passenger needs to be secured to the seat is not limited to the methods described above. The determination can be made by, for example, finding out whether the slipping angle of the vehicle wheel exceeds a predetermined value; whether the absolute value of the difference between the velocity of the left wheel and the velocity of the right wheel exceeds a predetermined value; or whether a vehicle-behavior stabilizing device (VSA, ABS, and TCS, etc.) has been operated.

If the result of step S3 is YES, the routine moves to the restraining control procedure S4, and moves to step S5 after completing the restraining control procedure S4. If the result of step S3 is NO, the routine proceeds directly to step S5.

In step S5, it is determined whether the position at which the webbing 5 is pulled out is within the predetermined lower and upper limit values. If the result is YES, the routine returns. If the result is NO, the routine proceeds to step S6, resets the calculation of the average electric current Iavg, and returns.

Figure 7:
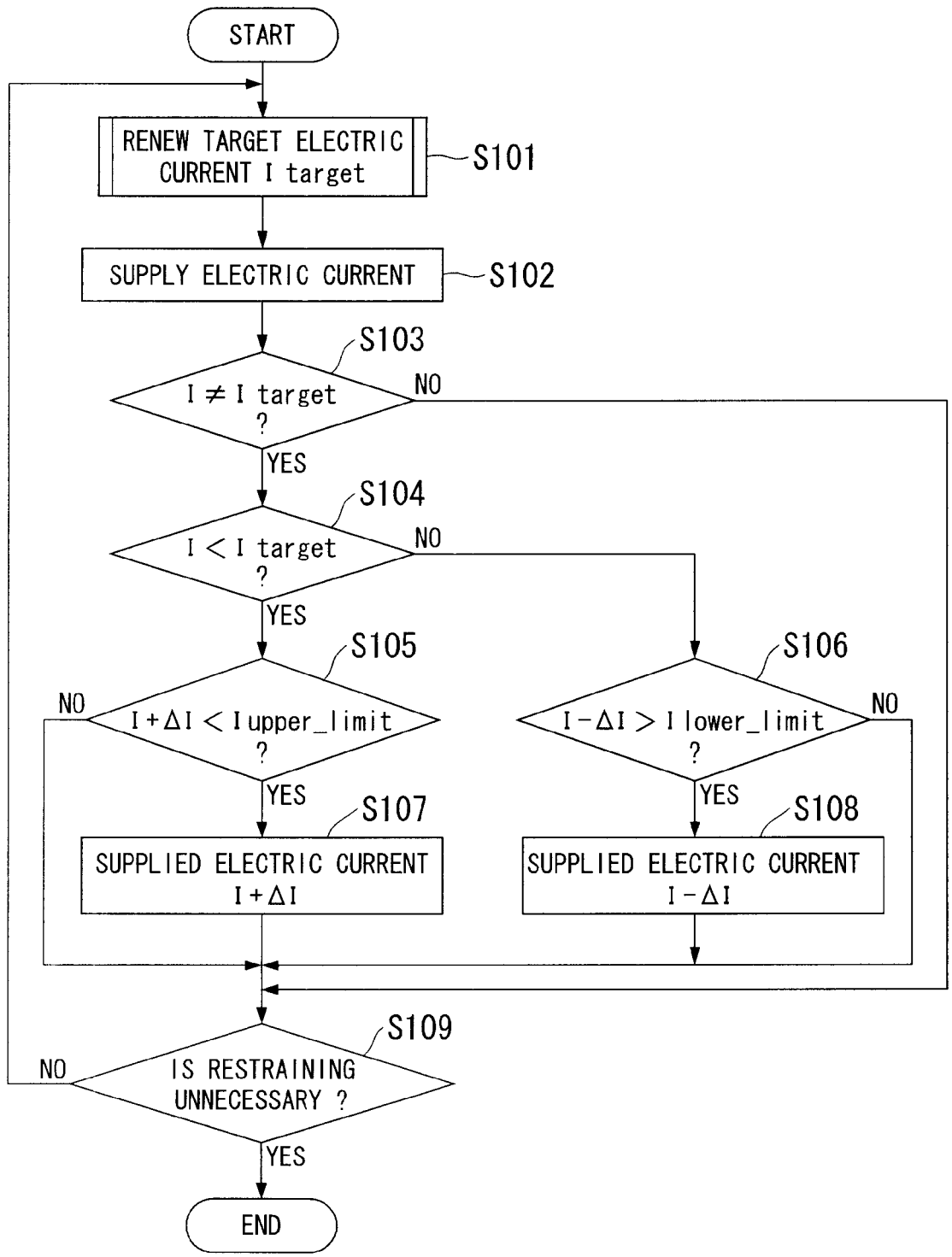
FIG. 7 is a flowchart showing a flow of a control according to the above embodiment of the present invention.

FIG. 7 shows the flow of the restraining control procedure S4.

In the restraining control procedure S4, the target amount of the electric current Itarget is renewed (hereinafter referred to as the renewing procedure (setting procedure) S101). After the renewing procedure S101, the electric current is supplied to the motor 10 in step S102. The initial flow of electric current supplied in step S102 is equal to a predetermined initial electric current value I0.

Next, in step S103, it is determined whether the electric current I presently flowing through the motor 10 is different from the target amount of the electric value Itarget. If the result is YES, the routine proceeds to step S104. If the result is NO, the routine proceeds to step S109.

In step S104, it is determined whether the amount of the electric current I presently flowing through the motor 10 is less than the target amount of the electric current Itarget. If the result is YES, the routine proceeds to step S105. If the result is NO, the routine proceeds to step S106.

In step S105, it is determined whether the value obtained by adding the amount of the present electric current I to a miniscule electric current $\Delta I$ is less than a predetermined upper limit value Iupper_limit. If the result is YES, the miniscule electric current $\Delta I$ is added to the value I, and the routine then proceeds to step S109. If the result is NO, the routine proceeds directly to step S109.

Meanwhile, in step S106, it is determined whether the value obtained by subtracting the miniscule electric current $\Delta I$ from the present electric current I exceeds a predetermined lower limit value Ilower_limit. If the result is YES, the miniscule electric current $\Delta I$ is subtracted from the value I, and the routine then proceeds to step S109. If the result is NO, the routine proceeds directly to step S109.

Steps S103-S107 and S108 described above compare the target amount of the electric current and the amount of the electric current presently flowing through the motor 10. When the two amounts are equal, the electric current is maintained. When the amount of the electric current presently flowing through the motor 10 is greater than or less than the target amount of the electric current, the steps described above increases or decreases the amount of the electric current within the upper and lower limits.

In step S109, it is determined whether the condition for releasing the restraining is satisfied. For example, it is determined whether the acceleration or the yaw rate deflection falls below a standard value. If the result is YES, the restraining control procedure is completed. If the result is NO, the routine returns to the procedure in which the target amount of the electric current Itarget is renewed (the renewal procedure S101).

Figure 8:
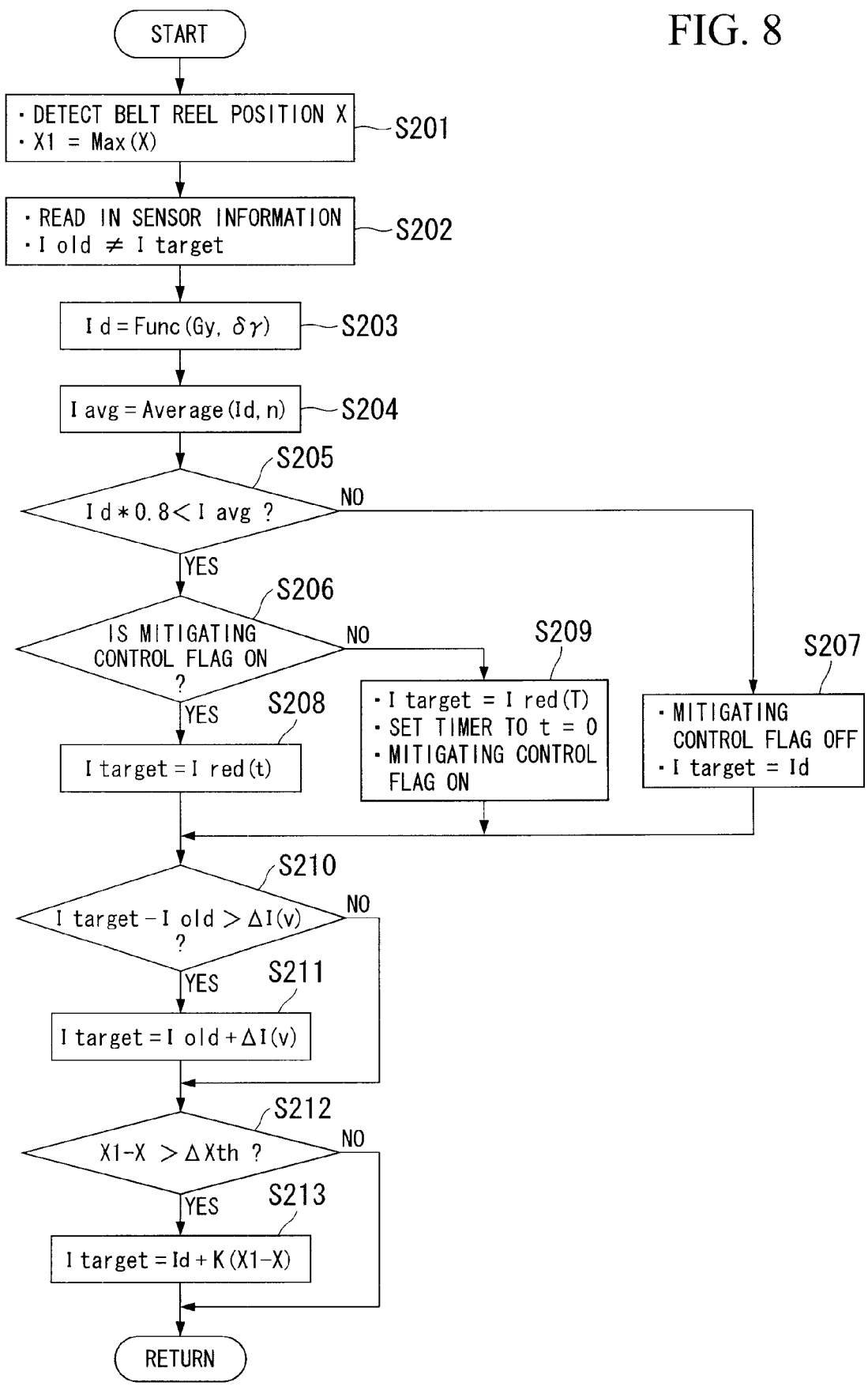
FIG. 8 is a flowchart showing a flow of a control according to the above embodiment of the present invention.

FIG. 8 shows the flow of the renewal procedure S101. In step S201, included in the renewal procedure S101 of the target amount of the electric current Itarget, the present rotational position X of the belt reel 12 is determined based on the signal detected by the rotational sensor 11. The present rotational position X of the belt reel 12 is set as the renewal value. If the renewal value is the maximum value since the procedure began (in other words, if the position at which the belt reel 12 is rolled up is maximum), the present rotational position X is stored as the maximum value X1 (recorded value).

According to the present embodiment, the maximum value of the change in the position of the belt reel 12 is used as the recorded value. However, it is also possible to use the average value of the change in the position of the belt reel 12 as the recorded value.

Next, in step S202', the signals detected by the lateral acceleration sensor 29 and the yaw rate sensor 31 are inputted. Then, the previous target value of the electric current Itarget is entered into Iold.

Next, in step S203, the standard target value of the electric current Id is computed based on the lateral acceleration Gy and the yaw rate deflection $\delta\gamma$. The value Id is also determined by referring to a map. In step S204, the average value of the electric current Iavg is calculated based on data regarding the standard target value of the electric current Id and its sampling number n.

Next, in step S205, it is determined whether the present standard target value of the electric current Id is smaller than the average value of the electric current Iavg by a certain degree. For example, the routine may determine whether the value Id*0.8 is less than the average value of the electric current Iavg. If the result is YES, the routine proceeds to step S206. If the result is NO, the routine proceeds to step S207.

In step S207, a mitigating control flag is turned OFF. The mitigating control flag indicates whether the electric current retention control mode (the control by the electric current retention controlling unit 36) will be turned on. The present standard target value of the electric current Id is then entered into the target value of the electric current Itarget. The routine then proceeds to step S210. Once step S207 is completed, the standard electric current control mode (the control by the standard electric current control unit 35) is turned on.

In step S206, it is determined whether the mitigating control flag is presently turned ON. If the result is YES, the routine proceeds to step S208. If the result is NO, the routine proceeds to step S209. In other words, when the result of step S205 is YES for the first time and the mitigating control flag is turned OFF, the routine proceeds to step S209. When the result of step S205 is YES for the second time and later, the routine proceeds to step S208.

Figure 10:
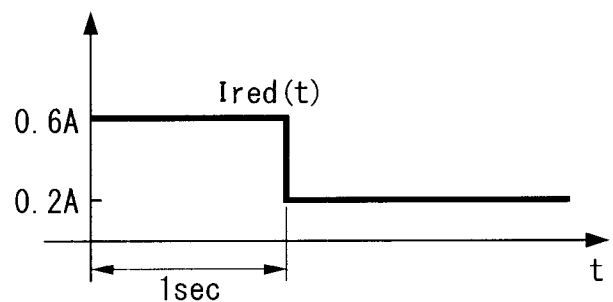
FIG. 10 is a graph showing an electric current retention control according to the above embodiment of the present invention.

In step S208, the reduced electric current Ired(t) is entered into the target value of the electric current Itarget. The reduced electric current Ired(t) is the amount of electric current that can maintain the connection of the clutch 20. The reduced electric current Ired(t) changes based on the time t that has passed since the control mode was altered. As shown in FIG. 10, the reduced electric current Ired(t) is set to the intermediate value of the electric current (such as 0.6 A) until the time t reaches a predetermined time (such as 1 second). After the predetermined amount of time has passed, the reduced electric current Ired(t) is set to the minimum value of the electric current (such as 0.2 A) that can maintain the connection of the clutch 20. After step S208, the routine proceeds to step S210.

In step S209, the timer value is set to zero. The timer value is used to measure time t. Time t is used to compute the reduced electric current Ired(t). The mitigating control flag is also turned ON. The reduced electric current Ired(t) is entered into the target value of the electric current Itarget. At this time, the value t equals zero. As a result, the target value of the electric current Itarget is set to an intermediate value of the electric current (such as 0.6 A). After completing step S209, the routine proceeds to step S210.

Once the steps S208 and S209 are completed, the electric current retention control mode (the control by the electric current retention controlling unit 36) is turned on.

Figure 11:
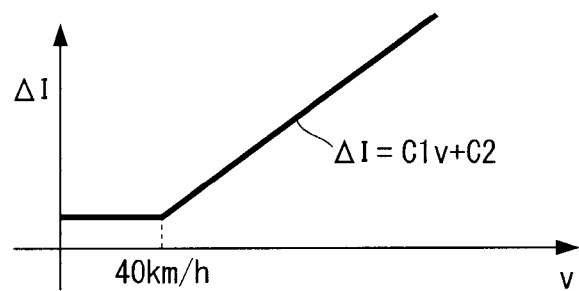
FIG. 11 is a graph showing a change in a velocity of an increase in an amount of electric current corresponding to a vehicle velocity according to the above embodiment of the present invention.

In step S210, it is determined whether the difference between the present target value of the electric current Itarget and the previous target value of the electric current Iold exceeds a regulation value ΔI(v). If the result is YES, the routine proceeds to step S211. If the result is NO, the routine proceeds to step S212. The regulation value ΔI(v) changes according to the present vehicle speed v. As shown in FIG. 11, the regulation value ΔI(v) is set to a constant C2 until the regulation value ΔI(v) reaches a predetermined vehicle velocity (for example, 40 km/h). After the regulation value ΔI(v) exceeds the predetermined vehicle velocity, the regulation value ΔI(v) is set to increase according to the vehicle velocity in the matter of C1*v+C2. The kinetic momentum such as the yaw rate deflection can also be taken into consideration in order to set the regulation value ΔI(v).

In step S211, the present target amount of the electric current Itarget is reset as the value obtained by adding the previous target amount of the electric current Iold to the regulation value ΔI(v). In other words, the present target amount of the electric current Itarget is modified so that the incremental amount of the electric current from the previous target amount of the electric current Iold is limited by the regulation value ΔI(v).

In step S212, it is determined whether the difference between the maximum value X1 of the position at which the belt reel 12 is wrapped up and the present rotational position X of the belt reel 12 exceeds a regulation value ΔXth. If the result is YES, the routine proceeds to step S213. If the result is NO, the routine ends the process.

In step S213, the target amount of the electric current Itarget is reset to the value obtained by adding the standard target amount of the electric current Id to the modified value obtained by multiplying a coefficient K with the difference between the maximum value X1 of the position at which the belt reel 12 is wrapped up and the present rotational position X of the belt reel 12 (Itarget=Id+K*(X1−X)). In other words, in step S213, the standard target amount of the electric current Id according to the condition of the vehicle is modified based on the width of the diversion from the maximum value X1 of the position at which the belt reel 12 is wrapped up. As the width of the diversion becomes greater, the target amount of the electric current Itarget is modified to a large value. After step S213, the routine ends the process.

Step S213 is performed when it is determined in step S212 that the width of the diversion exceeds ΔXth and a greater length of the belt reel 12 is actually pulled out. Thus, even when the control by the electric current retention controlling unit 36 (the electric current retention controlling mode) is selected, the target amount of the electric current Itarget is set to the value obtained by adding the modified value to the standard target amount of the electric current Id. Therefore, if the control by the electric current retention controlling unit 36 (the electric current retention controlling mode) has been carried out, the mode of control shifts to the operation by the standard electric current controlling unit 35 (the standard electric current controlling mode) when it is determined in step S212 that the width of the diversion exceeds ΔXth and a greater length of the belt reel 12 is actually pulled out.

Figure 12:
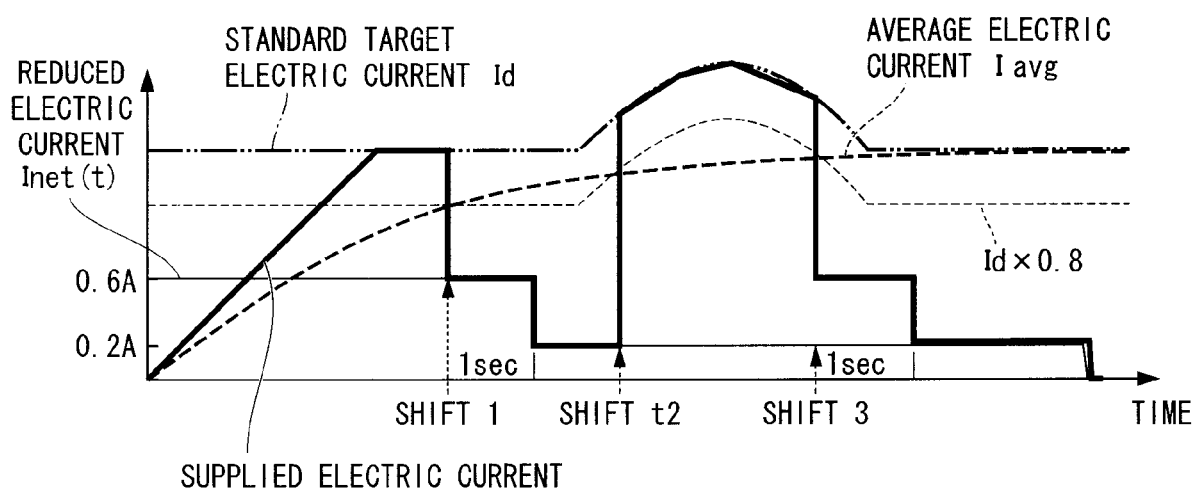
FIG. 12 is a graph showing a timing of a control according to the above embodiment of the present invention.

FIG. 12 is a timing chart showing an example of the control carried out by the controller 21 of the seatbelt device 1.

The timing chart is described hereon.

When the vehicle is running while the seatbelt device 1 is used, the standard target amount of the electric current Id is constantly calculated based on the lateral acceleration of the vehicle and the deflection of the yaw rate. As a result, a comparative value, multiplied by 0.8 for instance (refer to the dotted line in FIG. 12), is determined. At the same time, the sampling of the standard target amount of the electric current Id is performed along with the calculation of the average amount of the electric current Iavg.

According to this time chart, the amount of the electric current supplied to the motor 10 is controlled so that the amount initially reaches the standard target amount of the electric current Id. Electric current is then supplied to the motor 10 for a while with the standard target amount of the electric current Id being the target amount of the electric flow. When the electric current in the amount of Id continues to be supplied to the motor 10, the comparative value (Id*0.8) falls below the average amount of the electric current Iavg (refer to "shift 1" in FIG. 12). At this point, the target amount of the electric current shifts to the reduced electric current Ired(t). For example, the reduced electric current Ired(t) is set to an intermediate value of the electric current 0.6 A for one second, then reset to a minimum value of the electric current 0.2 A that can maintain the connection of the clutch 20.

After the electric current in the amount of Ired(t) continues to be supplied to the motor 10, the comparative value (Id*0.8) exceeds the average amount of the electric current Iavg (refer to "shift 2" in FIG. 12). The target amount of the electric current then shifts again to the standard target amount of the electric current Id. At this time, when the standard target amount of the electric current Id increases, the maximum value of the speed in which the target amount of the electric current increases is restricted to stay less than or equal to the regulation value ΔI(v).

When electric current is supplied to the motor 10 in the amount of Id, and the comparative value (Id*0.8) falls below the average amount of the electric current Iavg again (refer to "shift 3" in FIG. 12), the target amount of the electric current shifts to the reduced electric current Ired(t).

The timing chart presented in FIG. 12 shows an example of how the mode of control shifts between the control according to the standard amount of the electric current Id and the control according to the reduced electric current Ired(t). In each of these modes of control, when the width of deflection from the maximum value X1 of the change in the position at which the belt reel 12 is wrapped up exceeds ΔXth, the target amount of the electric current is modified to a target amount that takes the deflection width into consideration.

According to the seatbelt device 1 described above, when the vehicle is in a condition that requires the passenger to be secured by the seatbelt device 1, the motor 10 is controlled by means of a feedback control so that the amount of electric current flowing through the motor 10 equals the target amount set initially by the electric current target setting unit 34. When this control is carried out, and the present target amount of the electric current is greater than the past average value of the electric current, the standard electric current controlling mode is selected (electric current flows through the motor 10 in the amount of the standard target value Id). Meanwhile, if the present target amount of the electric current is less than the past average value of the electric current, the electric current retention controlling mode is selected (electric current flows through the motor 10 in the amount of the reduced electric current Ired(t)). Thus, when it is determined that the change in the position at which the belt reel 12 is wrapped up is relatively large, and the webbing 5 is therefore likely in the process of being wrapped up, the webbing 5 is promptly wrapped up under the standard electric current controlling mode. On the other hand, when it is determined that the change in the position at which the belt reel 12 is wrapped up is small, and the passenger is therefore likely being secured by the webbing 5, the electric current retention controlling mode is used so that the passenger will not be tied down with too much force.

Under the electric current retention controlling mode, it is possible to maintain the connection of the clutch 20. As a result, the motor 10 is connected to the belt reel 12 via the power transmission mechanism 13 (deceleration mechanism). Therefore, when a rotational force acts in the direction in which the belt reel 2 is pulled out while the electric current retention controlling mode is the mode of control, a torque of the motor 10, acting in the direction in which the belt reel 12 is wrapped up according to the drive current, becomes a large restraining force that restrains the withdrawal of the webbing 5.

Furthermore, according to the seatbelt device 1 described above, when the belt reel 12 moves a long distance exceeding the regulation value Xth in the direction in which the belt reel 12 is pulled out while the motor 10 is controlled by means of a feedback control, the target adjusting unit 38 increases the target amount of the electric current according to the width of the deflection in the change of the position of the belt reel 12. As a result, it is possible to secure the passenger more promptly. Moreover, the modification of the target amount of the electric current is performed by the target adjusting unit 38 only when the belt reel 12 moves a long distance exceeding the regulation value Xth in the direction in which the belt reel 12 is pulled out. Therefore, in other situations, the passenger will not be tied down with too much force. It is also possible to reduce the amount of electricity consumed by the motor 10.

In particular, according to the present embodiment, when the belt reel 12 moves in the direction in which the belt reel 12 is pulled out by a distance exceeding the regulation value Xth, the unit carrying out the control shifts from the electric current retention controlling unit 36 to the standard electric current controlling unit 35. In other words, the standard electric current controlling unit 35 regains control. Further, the target amount of the electric current, set by the standard electric current controlling unit 35, is modified by the target adjusting unit 38. As a result, it is possible to effectively prevent the belt reel 12 from being pulled out too suddenly.

In addition, according to the seatbelt device 1 described above, the target adjusting unit 38 modifies the target amount of the electric current in a cycle identical to the monitoring cycle of the rotational sensor 11 and the electric current detection unit 33. As a result, it is possible to adjust the control in an appropriate manner according to the change in the rotational position of the belt reel 12 and the change in the electric current.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention.

The invention is not to be considered as being limited by the foregoing description, and is only limited by the scope of the appended claims.

What is claimed is:

1. A seatbelt device of a vehicle, the seatbelt device comprising:
   a belt reel around which a webbing, used to tie down a passenger seated in the vehicle, is wrapped up;
   a motor transmitting a driving force to the belt reel;
   an electric current detection unit detecting an electric current flowing through the motor;
   a vehicle-condition detection unit detecting a condition of the vehicle;
   a rotation detection unit detecting a rotational position of the belt reel; and
   a control unit that sets a target electric current corresponding to a predetermined vehicle condition detected by the vehicle-condition detection unit and controls the motor so that the electric current detected by the electric current detection unit equals the target electric current, wherein
   when the motor is being controlled and the belt reel moves, by a displacement amount exceeding a regulation value, in a direction in which the belt reel is pulled out, a target adjusting unit included in the control unit modifies the target electric current based on the displacement amount,
   the control unit further comprising:
   a standard electric current controlling unit controlling the electric current flowing through the motor, so that the electric current detected by the electric current detection unit equals the target electric current corresponding to a signal detected by the vehicle-condition detection unit; and
   an electric current retention controlling unit supplying a small electric current to the motor wherein:
   when a fluctuation of the target electric current is small, the electric current retention controlling unit supplies the small electric current to the motor so that the motor retards movement of the belt reel in the direction in which the belt reel is pulled out; and
   when the motor is being controlled by the electric current retention controlling unit and the belt reel moves, by the displacement amount exceeding the regulation value, in the direction in which the belt reel is pulled out, the electric current retention controlling unit stops operating, and the standard electric current controlling unit starts operating again.

2. The seatbelt device according to claim 1, wherein the target adjusting unit modifies the target electric current in a cycle same as a monitoring cycle of the rotation detection unit and/or a monitoring cycle of the electric current detection unit.

3. The seatbelt device according to claim 1, wherein a present standard target value of the electric current that is determined as the signal detected by the vehicle-condition detection unit is modified so that an incremental amount of the electric current from a present standard target value of a previous target amount of the electric current is limited to be not greater than the regulation value, and the regulation value of the incremental amount is determined depending on a vehicle velocity.

* * * * *